Jan. 11, 1938.　　　　G. HORSFIELD　　　　2,105,246
TRAILER
Filed Jan. 7, 1935
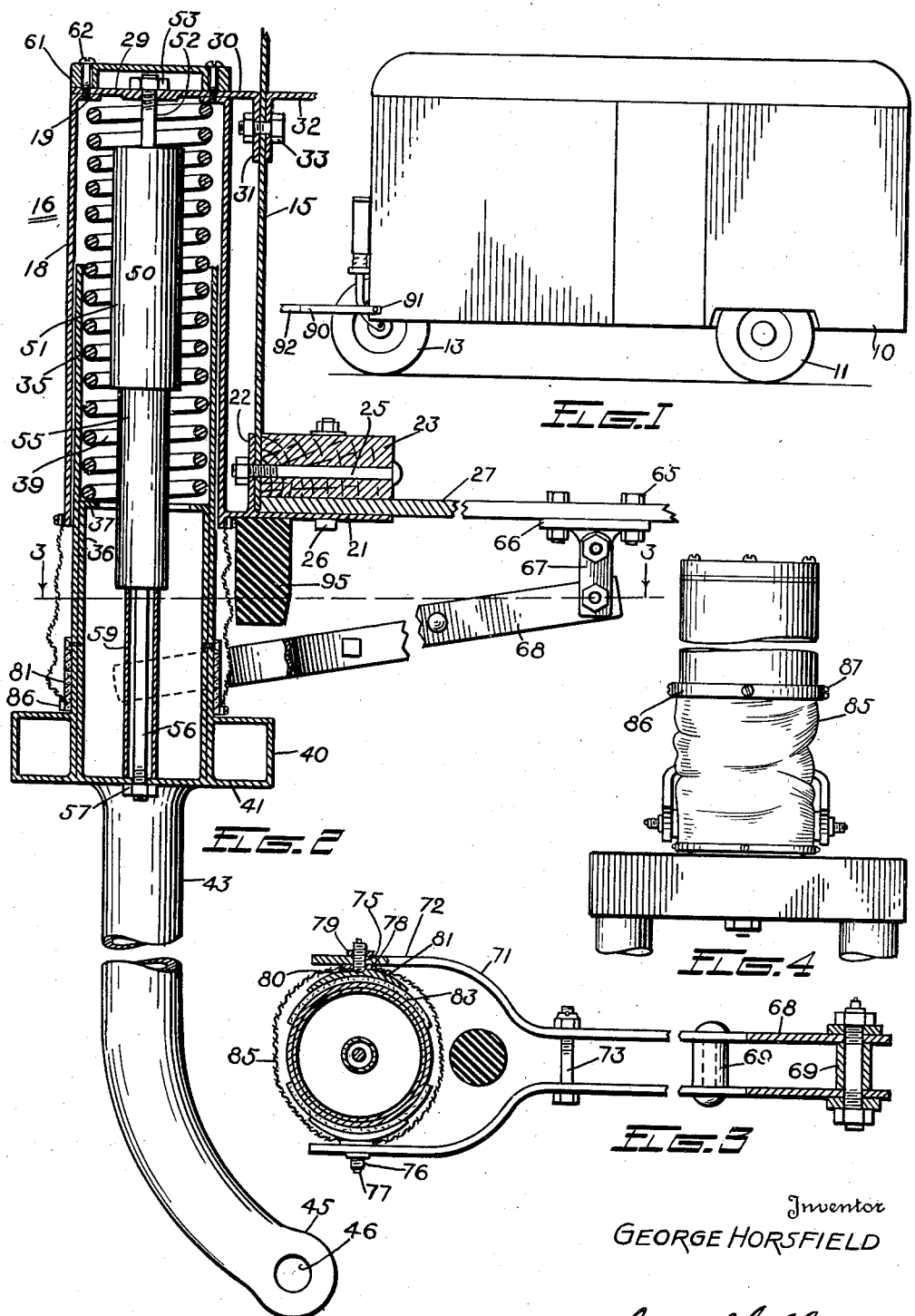
Inventor
GEORGE HORSFIELD
By Richmond S. Hayes
His Attorney Patented Jan. 11, 1938

2,105,246

UNITED STATES PATENT OFFICE 2,105,246

TRAILER

George Horsfield, Warren, Pa., assignor to Warren Trailer Parts Manufacturing Company, Inc., Warren, Pa., a corporation of Pennsylvania Application January 7, 1935, Serial No. 614

10 Claims. (Cl. 280—33.4)

This invention relates to an improvement in multi-wheeled towable vehicles and more particularly to vehicles of the class known as trailers for automobiles and the like.

The invention is particularly directed to trailers of the class generally towed by passenger automobiles such as house, boat and luggage trailers. The novel structural features of the disclosure adapt a trailer of this type to greater convenience in towing, parking and manipulation when disconnected from the towing vehicle. It is contemplated, however, that many of the novel structural features involved in the invention may be readily applicable and desirable on various commercial vehicle trailers. The invention particularly includes provision of a wheeled support for the forward end of a trailer. This support is provided with a swivel mounting and a vertically offset wheel axle by means of which a castor or trailing action of the wheel occurs when the forward end of the trailer changes laterally its direction of motion.

Prior to this invention vehicle trailers have been of the two or four wheel type. The two wheel vehicle trailer was connected by an arm or arms to the towing vehicle through a pivot member. This arm transmitted about one-third of the trailer weight to the towing vehicle, the remainder of the weight being sustained equally by the two trailer wheels which, in all practical instances, were mounted somewhat forwardly of the rear of the trailer and adjacent the weight center. This type of vehicle trailer was found to produce excessive wear on the towing vehicle which was generally not designed for this purpose. Four wheeled vehicle trailers include a front wheel steering mechanism of the type embodied in the towing vehicle or of the wagon type having a center pivot or fifth wheel. With this type of trailer the weight is equally distributed on four wheels and is not objectionable on the same basis as the two wheel trailer. It is found, however, that a four wheeled trailer must be generally of larger and sturdier proportion than the conventional two wheel trailer and it is therefore extremely cumbersome and heavy to move about by the average vehicle since said vehicle is not designed to move more than its ladened weight. The four wheel trailer, due to its size and weight, is not only more costly to manufacture but increases the cost of operation of the towing vehicle. Furthermore the forward end of a trailer of this type is necessarily cut away to provide clearance for front wheel steering. Consequently additional expense in building a trailer of this type is involved in adapting the trailer body to the requirements of the trailer chassis.

One of the objects of the invention lies in the provision of a front wheel mounting for trailers.

Another object of the invention lies in the provision of a castor or trailing type of front wheel for trailers.

A further object of the invention lies in the provision of suspension means for the front end of a trailer on a swivel wheel.

A further object of the invention lies in the provision of a shock absorber or check for the yieldable suspension means of the front end of a trailer mounted on a swivel wheel.

A further object of the invention lies in the provision of means for damping the swivel action of the wheel.

A still further object of the invention lies in the provision of vertically movable and adjustable means for supporting the swivel damping mechanism of the wheel.

Other and further objects of the invention may be more fully understood from a consideration of the following specification taken in conjunction with the accompanying drawing in which, Figure 1 is a side elevation of a trailer embodying a front wheel of the castor or trailing type;

Figure 2 is an enlarged vertical sectional view of the wheel mounting and trailer support;

Figure 3 is a horizontal sectional view taken substantially on the line 3—3 of Figure 2 showing the damping mechanism and adjustment therefor; and Figure 4 is a fragmentary front elevation of the wheel mounting and trailer support.

Referring to the drawing, one modification of the invention is shown applied to a more or less conventional type of house trailer, generally indicated by the reference numeral 10. The trailer includes a pair of rear wheels 11 which are located somewhat forwardly of the rear wall of the trailer and towards its weight center in order to sustain approximately two-thirds of the trailer weight. The forward end of the trailer is supported by one or more wheels 13. If a single wheel is utilized, as shown in Figure 1 of the drawing, a suitable recess is provided in the front of the trailer to permit a full three hundred and sixty degree swivel of the wheel. In the case of use of two front wheels 13 the forward corners of the trailer are recessed sufficiently to accommodate the wheels in any position.

Secured to a suitably reenforced front wall 15 of the trailer 10 is a front wheel trailer mounting and swivel device generally indicated by the reference numeral 16. This device includes a cylinder 18 which at its under end terminates in an inwardly directed annular flange 19. The lower end of the cylinder adjacent the trailer is provided with a horizontal plate 21 from which a flange 22 projects, spaced slightly from the wall of the cylinder. The flange 22 abuts the wall 15 at a point adjacent a transverse frame member 23. A bolt 25 secures the flange 22, wall 15, and member 23 together. A further bolt 26 projects through the plate 21, longitudinal frame member 27, and member 23. The upper end of the cylinder 18 is closed by a cap plate 29 which includes an extension 30 having a flange 31 abutting the wall 15 of the trailer. Reenforcement of the wall 15 may be provided by an angle plate 32, the plate 32, wall 15, and flange 31 being secured together by one or more bolts 33.

The lower end of the cylinder 18 is open and is fitted with a sleeve 35. The sleeve may be enlarged toward the lower end or provided with a reenforcing sleeve 36 secured in any suitable manner as by welding. The upper end of the inner sleeve 36 is inwardly flanged to provide an annular shoulder 37 on which is fitted the lower end of a compression spring 39. This spring projects beyond the upper end of sleeve 35 into cylinder 18 and abuts the under-face of the flange 19 of said cylinder. Upward movement of sleeves 35 and 36 into the cylinder 18 compresses spring 39. The lower ends of sleeves 35 and 36 may be made integral with a frame member 40 which includes a bottom plate 41. Integral with the member 40 and projecting from the bottom plate 41 are forks 43 which extend downwardly and are laterally curved to provide an offset wheel axle mounting 45. A suitable opening 46 is made in the mounting 45 to receive any conventional bearing sustained wheel axle, not shown.

Within the cylinder 18 is located a check or shock absorbing device 50 which includes a cylindrical member 51 and from the upper end of which projects a supporting shaft 52. This shaft projects through the cap plate 29, being secured relative thereto by a nut 53. Telescoping with the cylindrical member 51 is a cylinder 55 from the lower end of which projects a rod 56, which is in turn secured by a nut 57 to the bottom plate 41 of the mounting member 40. To prevent longitudinal displacement of the rod 56 it is enclosed by a sleeve 59 which abuts the inner face of the plate 41 and the lower end of cylinder 55. The structure above described is a conventional telescoping one-way acting shock absorber, the cylinder 55 being freely movable into the cylindrical member 51 but withdrawable only with regulated by-passing of fluid contained in the cylindrical member. Mounted on the cap plate 29 is a cover 61 which encloses the end of rod 52 and nut 53. This cover is held in place by screws 62, being removable to give access to vertical adjustment of the cylindrical member 51 of the shock absorber device for the purpose of altering the stroke thereof.

The method of mounting individual front wheels has been fully described as well as provision of a spring suspension and shock absorbing device for cushioning the front end of a trailer. In actual practice it has been found that means must be provided by which to dampen or check the swiveling movement of the wheel since it would otherwise tend to set up a shimmy which would develop into an uncontrolled whipping from one side to the other.

Any means for damping the swivel of this wheel must be so arranged that it will not interfere with the spring suspension between wheel mounting and trailer. One form of structure by which the swivel action of a castor type wheel may be controlled is shown in the drawing and consists of a shackle plate 66 which is attached in any suitable manner as by bolts 65 to the trailer member 27. A conventional shackle 67 is mounted on the plate 66 and has connected with the free end thereof a pair of arms 68. These arms are spaced apart approximately the width of the shackle by sleeves 69. The arms 68 extend forward beneath the supporting member 27 and are flared at 71 to form forks 72 for receiving the sleeve 35. Adjacent the flared portion 71 is located a bolt 73, adjustment of which increases or decreases the space between the flared ends of arms 68 since they are formed from spring steel. At any convenient point near the ends of arms 68 in the forks 72, concentric tapped openings 75 are made. Threadably engaged with the walls of the openings 75 are hollow pins 76. These pins are fitted with lubricant ball checks 77. Inner and outer lock nuts 78 and 79 are mounted on the pin. The rounded end 80 of the pin projecting beyond the inner nut 78 fits into a suitable cavity in a shoe 81. The shoe 81 is fitted with a friction liner 83, both liner and shoe conforming to the contour of the sleeve 35. The liner 83 is at all times in frictional contact with a portion of the outer surface of the sleeve 35, the degree of frictional contact being dependent on adjustment of bolt 73. Pins 76 serve as pivots for the ends of the arms 68 adjacent the sleeve 35 and since said arms are laterally movable through the shackle 67, the sleeve 35 may move inwardly of the cylinder 18 without affecting the position of shoes 81 and liners 83. To protect the exposed portion of sleeve 35, shoes 81 and liners 85 from dirt, a boot 85 is utilized. This boot is conventional, being made preferably of leather or rubber impregnated cloth, and is secured at one end to the lower end of cylinder 18 by means of a ring 86, held in place by screws 87. The lower end of the boot may be similarly joined to the lower edge of shoes 81.

One method of securing the front wheel support to the trailer has been shown and described but it is obvious that this structure will be modified to adapt the support to all types of trailer chassis and bodies. In operation, the device described is mounted on the forward end of a trailer, forks 43 projecting rearwardly and the wheel 13 projecting into a suitable recess or compartment in the trailer body. A curved tube or angular member 90 is attached in any suitable manner as by bolts 91 to the chassis of the trailer. This member is of such proportion as to provide full swivel clearance for the wheel 13. Secured centrally of the member 90 is a rod 92 on the end of which is provided suitable connector means for the towing vehicle. During towing the rod 92 and member 90 swing the forward end of the trailer into the desired trailing path. If this movement is to the right the wheel 13 swivels in that direction carrying the forward end of the trailer in the new direction so long as this force is applied through the member 90 to the trailer body. This swivel action of the wheel 13, as heretofore described, is restricted by the pressure, applied through the forks 72 and shoes 81, of the liners 83 upon the sleeve 35. During the turning operation it is conceivable that the wheel 13 may strike an obstruction which would cause the sleeve 35 to move upwardly into the cylinder 18 against the tension of spring 39. Rebound is controlled by the action of the shock absorber 50. During the upward and downward travel of sleeve 35 into and out of the cylinder 18, the arms 68 pivot about the shackle 67 and pins 75. Thus it may be understood that the spring suspension of the trailer is not interfered with by the damping device for the swivel wheel nor on the other hand is the damping device interfered with by simultaneous action of the spring suspension. Should the road obstruction be of such proportion as to tend to move the sleeves 35 into the cylinder 18 a greater distance than desired, it is contemplated to provide a recoil block 95 which will limit the relative movement of sleeve and cylinder. In the present instance the block 95 is secured to and projects downwardly from the plate 21 and will come into contact with the mounting member 40.

Although applicant has shown and described only one modification of mounting a castor or trailing type of wheel on the forward end of a vehicle trailer, it is obvious that other modifications or adaptations of this device are contemplated and will be used for different types of vehicle trailers and that these modifications or adaptations are contemplated as being within the spirit and scope of the invention in so far as they may be defined by the hereunto annexed claims.

Having thus set forth my invention what I claim as new and for which I desire protection by Letters Patent is:—

1. In a wheeled vehicle, a caster wheel mounting having a housing, a telescoping sleeve in said housing, a compression spring acting between said housing and said sleeve, means in said housing for controlling the action of said spring, a device acting on said sleeve to dampen movements thereof, and a wheel support depending from said sleeve.

2. In a wheeled vehicle, a wheel mounting comprising a cylindrical housing secured to said vehicle, a sleeve projecting into said housing, a spring supporting said housing on said sleeve, a wheel supporting fork on said sleeve, a friction device on said sleeve, said device being vertically movable with said sleeve and serving to dampen the swivel movement thereof relative to said housing.

3. In a wheeled vehicle, a wheel mounting comprising a cylindrical member, a sleeve projecting into and swivelable relative to said member, means supporting said member on said sleeve, a wheel supporting fork depending from said sleeve, a device for damping the swivel action of said sleeve, said device comprising a friction surfaced shoe in contact with said sleeve, and means sustaining said shoe in place, said means including further means for varying the pressure contact of said shoe on said sleeve.

4. In a wheeled vehicle, a wheel mounting comprising a housing secured to said vehicle, a sleeve projecting into said housing, supporting means mounting said housing on said sleeve, an offset wheel supporting fork depending from said sleeve, means vertically movable with said sleeve, said means including a surfaced shoe in frictional contact with said sleeve, an arm pivotally joined to and supporting said shoe, said arm being pivotally joined to said vehicle, and adjusting means for varying the frictional contact of said shoe on said sleeve.

5. In a wheeled vehicle, a caster wheel mounting including relatively rotatable telescoping elements, one of said elements being secured to said vehicle, yieldable means associated with and acting between said elements, a device acting on one of said elements to dampen movements thereof, and a wheel support depending from one of said elements.

6. In a wheeled vehicle, a caster wheel mounting including relatively rotatable telescoping elements, one of said elements being secured to said vehicle, yieldable means associated with and acting between said elements, said elements having bearing contact substantially throughout their interfitting length, a device acting on one of said elements to dampen movements thereof, and a wheel support depending from one of said elements.

7. In a wheeled vehicle, a caster wheel mounting including relatively rotatable telescoping elements, one of said elements being secured to said vehicle, yieldable means associated with and acting between said elements, means for controlling the action of said yieldable means, a device acting on one of said elements to dampen movements thereof, and a wheel support depending from one of said elements.

8. In a wheeled vehicle, a caster wheel mounting including relatively rotatable telescoping elements, one of said elements being secured to said vehicle, yieldable means associated with and acting between said elements, said elements having bearing contact substantially throughout their interfitting length, means inclosed by said elements for controlling the action of said yieldable means, a device acting on one of said elements to dampen movements thereof, and a wheel support depending from one of said elements.

9. In a wheeled vehicle, a caster wheel mounting including relatively rotatable telescoping elements, one of said elements being secured to said vehicle, a spring associated with and acting between said elements, said elements having bearing contact substantially throughout their interfitting length, a recoil device inclosed by said elements and adapted to control the action of said spring, a device acting on one of said elements to dampen movements thereof, and a wheel support depending from one of said elements.

10. In a wheeled vehicle, a caster wheel mounting including relatively rotatable telescoping elements, one of said elements being secured to said vehicle, yieldable means associated with and acting between said elements, said yieldable means being inclosed by said elements, further means inclosed by said elements, said further means being adapted to control the action of said yieldable means, said elements having bearing contact substantially throughout their interfitting length, and a device, movable in one direction with one of said elements, and acting to dampen movement thereof in another direction.

GEORGE HORSFIELD.